Nov. 22, 1966     A. F. J. GUILLERMIC     3,286,736

VALVE FOR USE WITH VISCOUS LIQUIDS

Filed June 10, 1963     2 Sheets-Sheet 1

INVENTOR
ANDRE F. J. GUILLERMIC

BY
Morgan, Finnegan, Durham & Pine
ATTORNEYS

Nov. 22, 1966     A. F. J. GUILLERMIC     3,286,736
VALVE FOR USE WITH VISCOUS LIQUIDS
Filed June 10, 1963                        2 Sheets-Sheet 2

INVENTOR
ANDRE F. J. GUILLERMIC
BY
Morgan, Finnegan, Durham & Pine
ATTORNEYS

United States Patent Office 3,286,736
Patented Nov. 22, 1966

3,286,736
VALVE FOR USE WITH VISCOUS LIQUIDS
Andre François Joachim Guillermic, Paris, France, assignor to The British Petroleum Company Limited, London, E.C. 2, England, a British joint-stock corporation
Filed June 10, 1963, Ser. No. 286,636
Claims priority, application France, June 25, 1962, 901,856
9 Claims. (Cl. 137—628)

The present invention relates to valves for use with viscous liquids and particularly with improved needle-type valves for use with heating appliances.

It is known to regulate the flow of liquid to a utilisation apparatus by providing a needle valve on the pipe connecting the apparatus with a storage tank.

The rate of flow supplied to the apparatus varies to a considerable extent with the viscosity of the liquid passing through the pipe system. This is particularly the case when the rate of flow is small and is for example less than a few litres per hour, which corresponds to a slight lifting of the needle.

It is known that the rate of flow depends upon the cross-section of passage between the needle and its seating and upon the pressure of the liquid.

In practice, needle valves regulating low rates of flow are most frequently fitted inside a constant level tank in such a way that the motive load corresponds to a height of liquid which is at most equal to a few centimetres.

Nevertheless, despite the effective increase in the cross-section due to the low pressures employed, needle valves still create noteworthy load losses in the annular space between the cone of their needle and the seating thereof, these load losses varying according to the viscosity of the liquid passing through them.

Attempts have been made to eliminate these variations by using guillotine type valves comprising a sleeve inside which is a movable telescopic tube. On the lower peripheral part of the valve there is arranged, between the sleeve and the telescopic tube, an annular space whose external shape is cylindro-conical. This space is capable of communicating with the interior of the telescopic tube through a slot of rectangular or square cross-section arranged in the lower part of the tube along one generatrix of the latter.

In such valves, the communication through the slot is blocked before the one which causes the liquid surrounding the sleeve to communicate with that contained in the abovementioned annular space. A true leakproof joint of the annular space is achieved by the application of a truncated conical surface of the telescopic tube on to an internal conical part provided in the lower part of the sleeve, or by the use of a plastic joint suitably arranged, or by any other suitable process.

However, the load losses in the different orifices through which the liquid passes in the above-mentioned sleeve and telescopic tube are still far from being negligible and these load losses also vary appreciably according to the viscosity of the liquid passing through the guillotine valves.

Accordingly it is an object of the present invention to minimise these drawbacks and relates to providing a valve for viscous liquid, the rate of flow of which, even in the case of low rates of flow, remains practically independent of variations in viscosity of the fuel passing through it.

According to the present invention we provide a valve having a low load loss in relation to motive pressure for selectively regulating and stopping the flow of viscous liquids, the valve including two members arranged so as to be movable relative to one another to open and close a passage through the valve, the two members having bevelled co-operating edges such that when the members are in an open position the passage so formed has a periphery completely comprised of bevelled edges.

It has been found that in the zone of low rates of flow using valves of the classical needle type the rate of flow obtained for a given setting, when the viscosity is varied within the extreme limits of two to ten centistokes corresponding to fuels usually employed in low-power apparatus, increases in the ratio of 1 to 2.5 as a minimum when the viscosity decreases, this coefficient of variation of rate of flow reaching a minimum of 1.7 when guillotine type valves are employed.

The use of the valve according to the present invention makes it possible to reduce these variations of rate of flow in the ratio of 1 to 1.5 as a maximum, still in connection with the special cases of low-power appliances.

The substantially constant regulation which is thus obtained for the feed flow of liquid fuel for a utilisation appliance prevents any excessive increase in this rate of flow for fuels with a low viscosity which would result in the production of uncombusted products.

The valve designed according to the present invention therefore provides, in the case of heating appliances of low and medium power, regulation of the rate of flow once and for all at its optimum level for the fuel having the highest viscosity, with the assurance that when there is an increase of flow of less than 15%, reckoned on the above-mentioned optimum rate of flow in the case of a fuel having the lowest viscosity, the rate will still be below the limit at which uncombusted fuel is produced.

In order that the invention can be more clearly understood two specific embodiments thereof will be hereinafter described, by way of example only, with reference to the accompanying drawings, in which.

Figure 1:
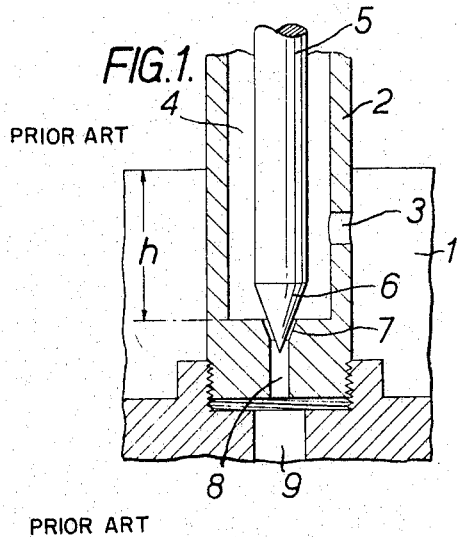
FIG. 1 is a cross-section through a needle valve of the classical type.

It can be seen from FIG. 1 that the liquid contained in the tank 1 is at a constant level $h$ in relation to the upper level of the hollow seating in the body 2 of the needle valve.

The fuel contained in the tank 1 passes through an orifice 3 into the annular space 4 between the needle 5 and the body 2 of the valve.

This liquid then passes between the point 6 of the needle 5 and the seating 7 of the needle 5, and finally passes into a bore 8 of comparatively small diameter arranged in the said seating 7 and communicating with the feed pipe 9 of a utilisation appliance.

At low rates of flow the load losses which are produced between the point 6 of the needle 5 and the seating 7 depend to a large extent on the viscosity of the liquid passing through the said needle valve.

Figure 2:
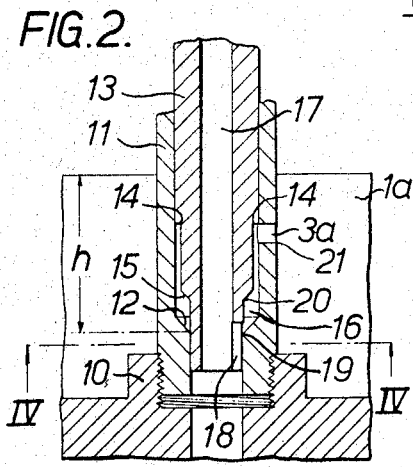
FIG. 2 is a cross-section through a guillotine valve of known type.

In the case of the guillotine valve of FIG. 2 a sleeve 11, is screwed onto a boss 10 the sleeve 11 having a tapered portion 12. A piston 13 is slidably mounted in sleeve 11 and has a shoulder 14 and a conical part 15 producing between the sleeve 11 and the piston 13 an annular space 16 which communicates with the chamber 1$a$ surrounding the valve by a duct 3$a$.

Figure 4:
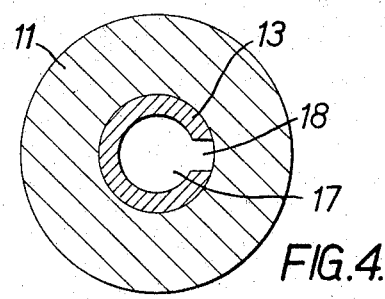
FIG. 4 is a cross-section taken along the line IV—IV of the guillotine valve of FIG. 2.

The annular space 16 communicates with an interior bore 17 of the piston 13 through a vertical slit 18 arranged in the piston (FIG. 4).

When the piston 13 descends, the upper part of the slit 18 arrives at the base 19 of the tapering part 12 of the sleeve 11 and then the solid part 20 of the piston descends below the level 19. The communication between the annular space 16 and the bore 17 is then cut off.

The shoulder 14 then reaches the level 21 thus cutting off any communication between the space 16 and the pipe 3a.

At the same time the conical part 15 of the piston is applied to the conical part 12 of the sleeve, thus forming a leakproof joint between the annular space 16 and the bore 17 of the valve which is already isolated on the other side from the pipe 3a.

The viscosity dependent load losses are produced mainly at the level of the vertical slot 18, the upper part of the annular space 16 being of small diameter also creates a considerable viscosity dependent load loss because of the comparatively long length between the shoulder 14 and the top of the conical part 15 of the piston 13.

Under these conditions experience has shown, that the rate of flow of such a valve for a given setting still varies appreciably according to the viscosity of the fuel which passes through it, this variation of rate of flow, although less than in the case of needle valves, still being too great to allow a regulation of the rate of flow which is practically independent of the viscosity of the fuel employed.

Figure 3:
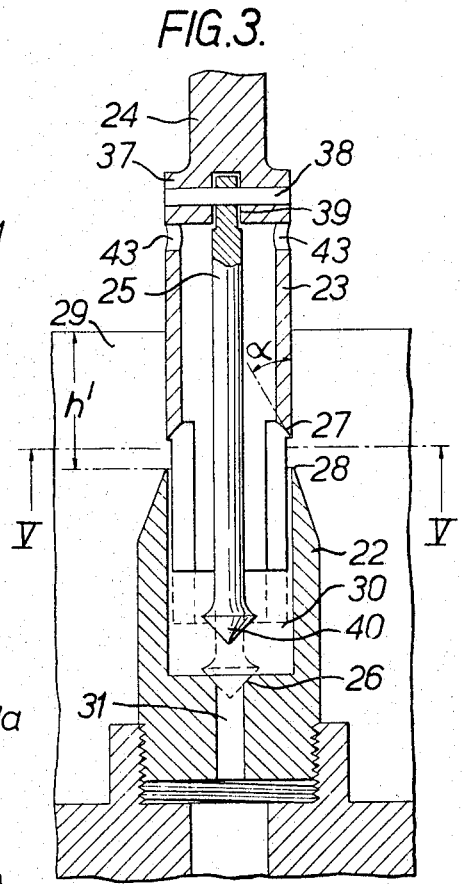
FIG. 3 is a cross-section through a valve according to the present invention.

In the valve according to the present invention, and which is shown in FIG. 3, it can be seen that the level $h'$ of the liquid is of the same order as the level $h$ used in the case of the needle valve and of the guillotine valve of FIGS. 1 and 2.

The new valve consists of a sleeve 22 inside which moves a piston composed of an annular part 23, a piston rod 24 and a floating flap 25. The head of the flap 25 is applied at the end of its stroke to a seating 26 arranged in the sleeve 22.

The annular part 23 of the piston ends in a bevel 27 at the top part of two vertical slots arranged in its lower part. The upper part of the sleeve 22 also ends in a circular bevel 28. The communication between the fuel tank 29 and the annular space 30 communicating with the bore 31 of the sleeve 22 is throttled over a short length, comprised between the horizontal edges 27 and 28 having a thickness which is less than 0.3 mm.

Figure 5:
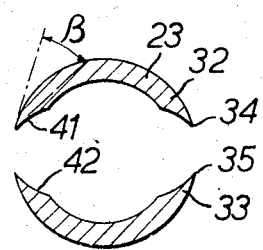
FIG. 5 is a cross-section taken along the line V—V of the valve of FIG. 3.

It can also be seen in FIG. 5 that the annular part 23 is extended between the vertical slots by two parts 32 and 33 which are also limited by sharp edges 34 and 35 along the vertical edges of the slots.

The flow of liquid in the two throttled parts between the sharp edges 27, 28, 34 and 35 produces a load loss which is very small in relation to the motive pressure. This produces, for a given regulation, a rate of flow which is practically independent of the viscosity of the fuel employed, even for low rates of flow where the edge 27 is very close to the edge 28.

Unlike guillotine valves of known types, the present valve does not possess, upstream of its flow regulating device, parts having a small cross-section, such as the annular space 16 and the duct 3a of FIG. 2, which are themselves liable to bring about quite considerable load losses in relation to the motive pressure when used with fuels of high viscosity. The only load losses which occur in regard to the rate of flow are at all times negligible in relation to the motive pressure.

The flap 25 which co-operates with the seating 26 is mounted so as to float on a shoulder 37 of the piston rod 24, a cotter pin 38 and a longitudinal clearance 39 allowing the floating flap 25 to be self-positioning to produce a good fit of its head 40 on seating 26.

The application of head 40 to seating 26 does not take place until after the communication between the tank 29 and the space 30 has been closed.

In practice the flap head 40 is not applied to the seating 26 until the the piston has travelled a distance equal to double that necessary to close the communication between the tank 29 and the space 30.

It will be seen in FIG. 3 that the edge 27 is obtained by means of a curved or plane surface defining an angle $\alpha$, which is less than 30°.

The conical bevel 28 of the sleeve 22, corresponds to an angle of cone aperture of less than 45°, that is to say an angle of less than 22.5° for the edge itself.

Finally, it can be seen from FIG. 5 that the vertical edges 34 and 35 are obtained by means of curved or plane recesses 41 and 42 which define the angles $\beta$ which are less than 30° in relation to the external cylindrical surfaces of the vertical parts 32 and 33.

With the provision of an extremely thin wall at the point of throttling for regulating the rate of flow, a flow is obtained which is practically independent of variations in viscosity for a given regulation of the height of the piston in relation to the seating of the valve. The annular part 23 is pierced in its upper part by two orifices 43 which act as breathers.

The diameter of the flap head 40 is less than that of the drilling in the lining 22, which ensures that the liquid located in the annular space 30 does not undergo any appreciable load loss due to the said head 40 and does not accumulate at the entrance to the bore 31.

Furthermore, the profile of flap 40 is such as to ensure a regular flow of the fuel coming from the tank 29 when the piston rises and the edges 27 move away from the edge 28.

The sliding part 23 of the piston could be actuated by a different means from the rod 24, and the flap head 40 could be floatably connected to the shoulder 34 by any other suitable means, such as the flexibility of the rod 25.

Experience has shown, as previously mentioned above, that the valve according to the present invention allows low rates of flow and for a given regulation of the height of the piston a variation in rate of flow of fuel which is at most equal to 15%, or variations in viscosity of between 2 and 10 centistokes.

Figure 6:
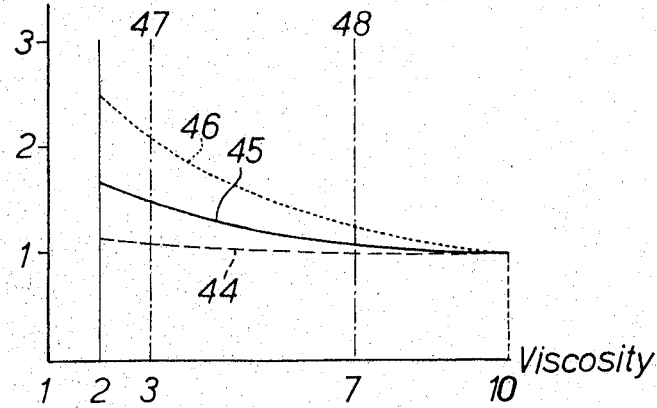
FIG. 6 is a diagram showing the variations in flow obtained with a needle valve, a guillotine valve of known type and a valve according to the invention respectively, in relation to the viscosity of the fuels employed.

These variations in flow in relation to the viscosity are illustrated in FIG. 6, where the curve in broken lines 44 corresponds to the use of a valve in accordance with the present invention, whereas the curve in solid lines 45 corresponds to the use of a guillotine valve and the curve in dotted lines 46 corresponds to the use of a needle valve of the ordinary type.

The total variation in flow obtained by varying the viscosity between 2 centistokes and the above-mentioned maximum corresponds to a relationship of the order of 1.15 for curve 44 for the valve according to the present invention, to a ratio of 1.7 for the curve 45 and a ratio of 2.5 for curve 46.

At 47 and 48 there has been shown the limits of viscosity of 3 and 7 centistokes corresponding to the value for fuels usually employed.

The practical variation in flow which is obtained between the two vertical lines 47 and 48 is therefore negligible in the case of the curve 44.

Figure 7:
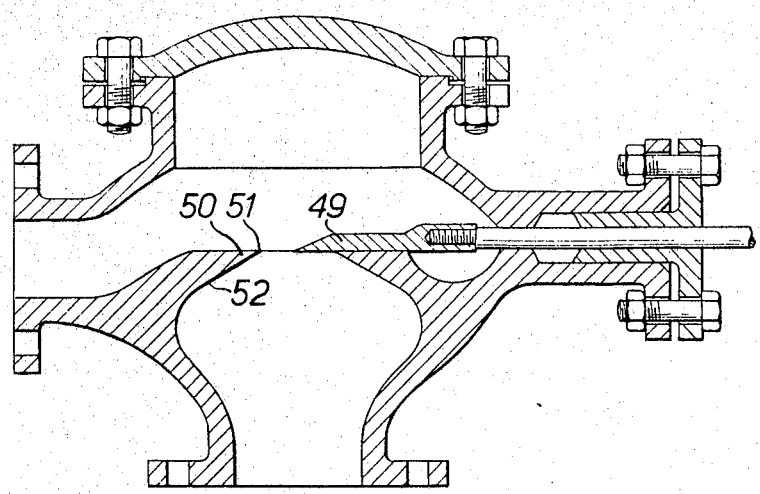
FIG. 7 is a cross-section through a valve according to the present invention mounted on a T valve.

In the case of the T valve of FIG. 7, a slide 49 is moved horizontally in relation to the circular bevel 50 corresponding to the intersection of a plane surface 51 and a part 52 which presents an appropriate curvature.

It can be seen that with a T valve of this kind the load losses are very small at the level of the throttled parts between the bevelled slide 49 and the circular bevel 50.

I claim:

1. A valve having a low load loss in relation to motive pressure for selectively regulating and stopping the flow of viscous liquids, the valve including two members arranged so as to be movable relative to one another to open and close a passage through the valve, the two members having bevelled co-operating edges such that when the members are in an open position the passage so formed has a periphery completely comprised of bevelled edges.

2. A valve as claimed in claim 1 wherein one of the members comprises a hollow cylindrical piston formed with at least one longitudinal slot, the edges of the slot being formed with internally cut bevels, and the other member comprises a sleeve in which the piston is slidably mounted, the sleeve having an externally cut circular bevel which co-operates with the slot to provide said passage.

3. A valve as claimed in claim 2 wherein the edges of the slot have a thickness of less than 3/10 of a millimetre.

4. A valve as claimed in claim 3 wherein the bevelled edges of the slot are formed by the intersection of two surfaces which are inclined in relation to one another at an angle of less than 30°.

5. A valve as claimed in claim 2, wherein the circular bevel is comprised between the internal cylindrical wall of the sleeve and an external conical surface having an angle of aperture of less than 45°.

6. A valve as claimed in claim 2, wherein the piston carried internally a floating flap which co-operates with a valve seating in the sleeve when the piston and the sleeve are relatively positioned such that said passage is closed.

7. In a valve having a low load loss in relation to motive pressure for selectively regulating and stopping the flow of viscous liquids, the improvement which comprises a sleeve having a passage therethrough for said fluid and an externally cut bevel at one end of said passage, and a piston slidably mounted in the sleeve at said one end of the passage having at least one slot which upon movement of the piston cooperates with the externally cut bevel in said sleeve to open and close said passage, the edges of the slot in said piston having internally cut bevelled edges such that when the passage is open its periphery is completely comprised of bevelled edges.

8. In a valve having a low load loss in relation to motive pressure for selectively regulating and stopping the flow of viscous liquids, the improvement which comprises a hollow sleeve having a bore therethrough of reduced size at its lower end, a valve seat in said bore and an externally cut bevel at the hollow end of said sleeve, a piston slidably mounted in the sleeve having two longitudinal slots which upon movement of the piston cooperate with the externally cut bevel in said sleeve to open and close said passage, the edges of the slots in said piston being internally cut bevelled edges such that when the passage is open its periphery is completely comprised of bevelled edges, and a floating flap carried internally by the piston and extending therefrom, said floating flap being seated in the valve seat of said sleeve after the piston has closed the hollow end of said sleeve.

9. A valve having a low load loss in relation to motive pressure for selectively regulating and stopping the flow of viscous liquids, the valve comprising two members arranged so as to be movable relative to one another to open and close a passage through the valve, one member comprising a hollow cylindrical piston formed with at least one longitudinal slot the edge of which has an internally cut bevel formed by the intersection of two surfaces which are inclined in relation to one another at an angle of less than 30°, and the other member comprising a cylindrical sleeve in which the piston is slidably mounted, one end of the sleeve having an externally cut circular bevel formed by the internal cylindrical wall of the sleeve and an external conical surface having an angle of aperture of less than 45°, the circular bevel on the sleeve cooperating with the slot to provide the said passage.

References Cited by the Examiner

UNITED STATES PATENTS

| | | | |
|---|---|---|---|
| 1,383,005 | 6/1921 | Mertens | 137—625.38 |
| 1,942,426 | 1/1934 | Hunter et al. | 137—625.3 |
| 2,109,351 | 2/1938 | Fisher | 137—625.38 X |
| 2,866,477 | 12/1958 | Bredtschneider et al. | 137—628 |

FOREIGN PATENTS 947,040  1/1964  Great Britain.

WILLIAM F. O'DEA, *Primary Examiner.*

C. R. GORDON, D. MATTHEWS, *Assistant Examiners.*